G. C. LATHROP.
Assignor to W. W. GILES.
Machine for Sawing Wood.
No. 8,916. Reissued Sept. 30, 1879.
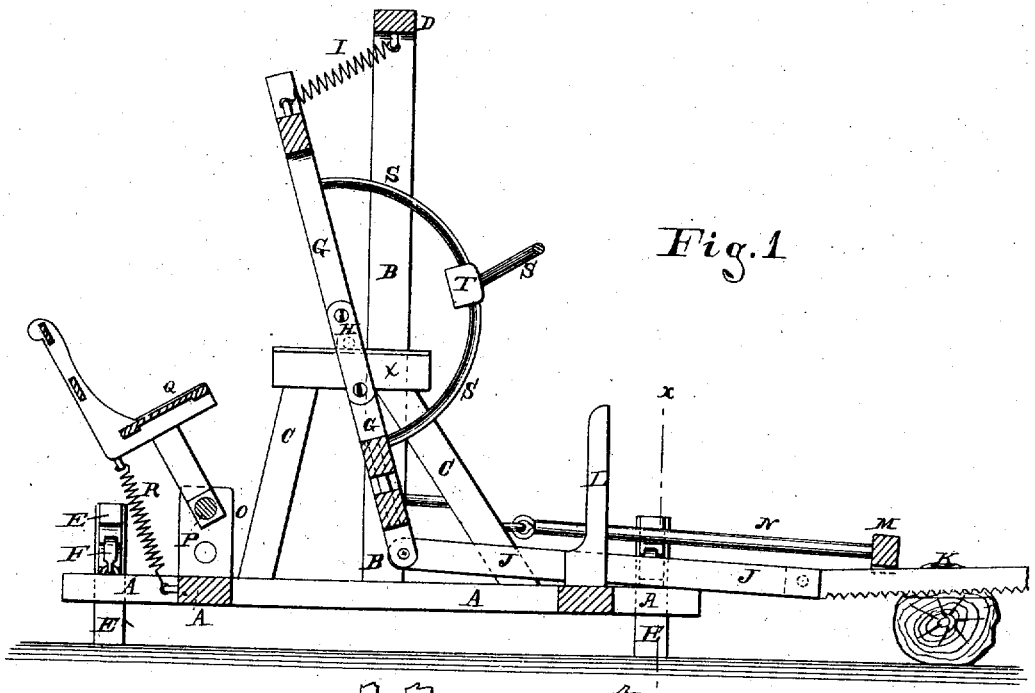
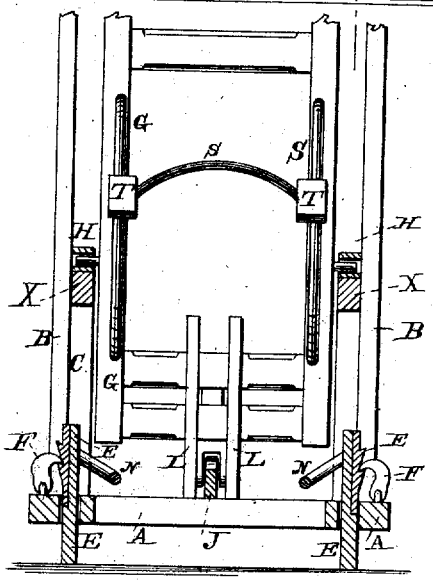
Attest
W. H. H. Knight
Inventor
George C. Lathrop.
By A. Allesworth.
His attorney.
N. PETERS, PHOTO-LITHOGRAPHER, WASHINGTON, D. C.

UNITED STATES PATENT OFFICE.

GEORGE C. LATHROP, OF DANSVILLE, MICHIGAN, ASSIGNOR TO WM. W. GILES, OF CHICAGO, ILLINOIS.

IMPROVEMENT IN MACHINES FOR SAWING WOOD.

Specification forming part of Letters Patent No. 68,517, dated September 3, 1867; Reissue No. 8,916, dated September 30, 1879; application filed July 24, 1879.

*To all whom it may concern:*

Be it known that I, GEORGE C. LATHROP, of Dansville, in the county of Ingham and State of Michigan, have invented a new and Improved Machine for Sawing Wood; and I do hereby declare the following to be a full, clear, and exact description thereof, which will enable others skilled in the art to make and use the same, reference being had to the accompanying drawings, forming part of this specification, in which—

Figure 1 represents a vertical longitudinal section of my improved sawing-machine. Fig. 2 is a vertical cross-section of the same, taken in the line *x x*, Fig. 1.

Similar letters of reference in the several figures of the drawings denote the same parts.

My invention is designed to provide a portable machine for sawing wood which can be operated by one man seated upon the machine; and to this end it consists in the combination of a seat with the sawing-machine, by which the operator, when seated, can operate the saw-driving mechanism with his hands or feet, or with his hands and feet conjointly.

It also consists in the means employed for leveling the machine upon the ground; and it finally consists in the provision of means for guiding and weighting the saw when in operation.

In the accompanying drawings I have shown one method of carrying my invention into operation, which I will now proceed to describe.

A is a rectangular horizontal bed or frame, made of wood or other suitable material. B B are two upright posts secured in the bed A opposite each other, and connected at the top by a cross-bar, D. Inclined braces C C on each side the frame serve to steady the posts, and form supports for the cross-heads X X.

E E are the feet or supports of the frame A, and are provided with teeth, as shown in Fig. 2. They are passed through slots in the frame, and are held in any desired position to level the frame upon the ground by means of pawls F.

G is the lever for driving the saw, which is connected at its lower end to a pitman, J. In this example of the invention the lever G is made in the form of a frame, of wood or other suitable material, and is pivoted to the cross-heads X so as to swing freely on its pivots.

A spiral or other spring, I, may connect the upper end of the frame with the cross-bar D, which tends to keep the frame in a vertical position. L is an upright arranged on the frame for guiding the saw-pitman.

M is a cross-bar slotted to receive the back of the saw, upon which it rests to form a weight and guide when the saw is in operation. The bar M is connected to the braces C C by hinged bars N N, so that it can be swung off and on the saw when necessary.

Q is the operator's seat, attached to a cross-bar, P, having its bearings in two ears or uprights, O O, rising from the rear end of the frame. The seat is hung so as to turn freely in its bearings, and is pulled to the rear by a spring, R.

To operate the machine the operator seats himself upon the chair Q, and grasps the upper cross-bar of the lever or frame G with his hands and places his feet, upon the lower cross-bar. By alternately pushing and pulling with his hands, assisted by the alternate pulling and pushing with his feet, the lever is vibrated to reciprocate the saw. The part of the frame G above the pivot thus becomes a hand-lever, and the part below the pivot a foot-lever, both of which are acted upon by the operator. The seat turns upon its pivot-bar at each motion of the lever-frame, so that the weight of the operator's body may aid in moving the lever for driving the saw. The lever may be vibrated to drive the saw by the hands of the operator, or by his feet, and in either case the weight of his body may or may not assist the operation.

As shown in the drawings, the seat may be adjustable vertically in the ears or lugs O, for the purpose of changing its height with respect to the operating lever or frame G.

S S are bows or handles, which may be attached to the front of the frame G for use in placing the machine into the desired position, and T are weights which may be applied to the bows to assist the operation of the lever by their momentum.

Having thus described my invention, what I claim as new, and desire to secure by Letters Patent, is—

1. A sawing-machine consisting of a supporting-frame, a pivoted lever mounted on the frame and connected with the saw, for reciprocating it, and a vibratory seat arranged on the frame, to enable the operator to use the power of his hands and feet, either or both, in operating the sawing mechanism, for the purpose specified.

2. In a sawing-machine, a foot-lever, a hand-lever, and a vibratory seat mounted upon the frame, to enable the operator to reciprocate the saw, for the purpose specified.

3. In a sawing-machine, a foot-lever, a hand-lever, and a vibratory spring-seat mounted upon the frame, to enable the operator to reciprocate the saw, for the purpose specified.

The above specification of my invention signed by me this 8th day of July, 1879.

GEORGE C. LATHROP.

Witnesses:
T. H. GIBBONS,
E. A. ELLSWORTH.